(12) United States Patent
Mansker et al.

(10) Patent No.: US 8,087,027 B2
(45) Date of Patent: Dec. 27, 2011

(54) COMPUTER PROGRAM PRODUCT AND SYSTEM FOR DEFERRING THE DELETION OF CONTROL BLOCKS

(75) Inventors: Janna Lynn Mansker, San Jose, CA (US); Betty Joan Patterson, Hollister, CA (US); Bruce Eric Naylor, Morgan Hill, CA (US); Sandra Lee Stoob, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1305 days.

(21) Appl. No.: 11/693,570

(22) Filed: Mar. 29, 2007

(65) Prior Publication Data

US 2008/0244596 A1    Oct. 2, 2008

(51) Int. Cl.
  *G06F 9/46* (2006.01)
  *G06F 12/00* (2006.01)
  *G06F 17/30* (2006.01)
(52) U.S. Cl. ........................ 718/104; 707/813
(58) Field of Classification Search ............. 718/104; 707/813
  See application file for complete search history.

(56) References Cited

U.S. PATENT DOCUMENTS

| | | | |
|---|---|---|---|
| 4,961,134 A | 10/1990 | Crus et al. | |
| 5,491,815 A | 2/1996 | Basso et al. | |
| 5,504,886 A | 4/1996 | Chang et al. | |
| 6,547,007 B2 | 4/2003 | Szarka et al. | |
| 6,823,472 B1 * | 11/2004 | DeKoning et al. | 714/10 |
| 6,981,116 B2 | 12/2005 | Jolly | |
| 7,072,981 B1 | 7/2006 | O'Rourke et al. | |
| 7,287,136 B2 * | 10/2007 | Miyauchi | 711/160 |
| 7,478,210 B2 * | 1/2009 | Saha et al. | 711/159 |
| 2002/0055941 A1 * | 5/2002 | Kolodner et al. | 707/200 |
| 2003/0115327 A1 * | 6/2003 | Kokado et al. | 709/225 |
| 2004/0194096 A1 * | 9/2004 | Armstrong et al. | 718/100 |
| 2006/0167960 A1 * | 7/2006 | Lomet | 707/206 |

FOREIGN PATENT DOCUMENTS

JP    63-178368    7/1988

OTHER PUBLICATIONS

"Control Block Fading Algorithm," Goldberg, S.H. Oct. 1998 IBM Research Disclosure n306 10-89. p. 1-2.
"Automatic Classification of a Document and an Owner's View of a Document Based on an Enterprise's Business Purpose Classification Scheme," MacPhail, M.G., Research Disclosure, Oct. 1989, No. 306, Kenneth Mason Publications Ltd, England.
"Storage Algorithm for Chains of Control Block Pools," Gupta, SK et al. IBM Technical Disclosure Bulletin, Nov. 1980.

* cited by examiner

*Primary Examiner* — Emerson Puente
*Assistant Examiner* — Nikhil Krishnan
(74) *Attorney, Agent, or Firm* — Kunzler Needham Massey & Thorpe (57) ABSTRACT

A computer program product and system are disclosed for deferring the deletion of resource control blocks from a resource queue within an information management system that includes a plurality of short-term processes and a plurality of long-term processes when each of the long term processes has unset a 'resource in use' control flag for that long term process, a 'request deletion' flag has been set by the information management system, and a predetermined amount of time has elapsed.

8 Claims, 7 Drawing Sheets

COMPUTER PROGRAM PRODUCT AND SYSTEM FOR DEFERRING THE DELETION OF CONTROL BLOCKS

BACKGROUND OF THE INVENTION

1. Field of the Invention

The present invention relates to information management systems and more particularly to a method for deferring the deletion of control blocks used by transaction manager programs.

2. Description of the Related Art

Transaction management systems, such as IBM's 'Information Management System—IMS' typically use control blocks to represent and manage resources that are defined to the system, such as allowed transactions, programs and databases. These control blocks contain the definitional attributes of the resource, including the name of the resource, and also the operational status, such as 'scheduled' or 'stopped', of the resource. A control block for a transaction resource may also include the name of the application program that is to be scheduled when the transaction is received. A control block for a program resource contains the name of the application program and may also contain the language in which the application program is written.

Resource control blocks are kept on queues, such as a linked list in which each resource control block points to the next resource control block on the queue. When the transaction management system needs to locate a control block for a resource, it scans the control blocks on the queue looking for a control block with the same name as the resource. For example, when a transaction comes in, the name of the application program associated with the transaction is obtained from an associated transaction control block. The program control block is then located and the application program is scheduled and given control of certain processing resources.

While the program is running, it has a status of scheduled. Programs cannot be changed or deleted while they are scheduled.

In a multi-tasking environment, a control block may be referenced concurrently by multiple tasks without explicitly informing the task which originally created the control block, i.e. the 'owning task'. If the owning task or another task deletes the storage while other tasks are referencing it, those other tasks could abnormally terminate when they try to access the storage. In order to prevent this type of failure from occurring, there needs to be a way to:

- prevent a control block from being deleted when it is in use by a long-running process task,
- logically delete the control block first when it is no longer in use by a long-running process task, but may still be in use or referenced by a short-running process task, and to only physically delete the control block at a time when all short-running process tasks have finished accessing the block There is a long felt need, within transaction management systems, for a computationally efficient method of deleting control blocks while ensuring that all short running processes have stopped referencing these control blocks.

To solve the aforementioned problems associated with managing control blocks in a transaction management system, the present invention is a unique method for deleting control blocks while avoiding complex serialization (CS) algorithms, such as locking and semaphore types of algorithms. The present invention also avoids the use of counts associated with each block as is known in the prior art.

SUMMARY OF THE INVENTION

From the foregoing discussion, it should be apparent that a need exists for a computer program product and system that deals with deleting of blocks that may be accessed by concurrent processes in a simple manner.

The present invention is a method for logically deleting control blocks so that they cannot be found by short-running process tasks, while deferring the physical deletion of the storage until a later point in time. Deletion of control blocks is not allowed while they are in a state where any long-running process task accesses them; in such case, a delete request would fail. When it can be guaranteed that no long-running process tasks are accessing a block, it can be logically deleted. After a predetermined time, when it can be assumed that any short-running process tasks that have, or that might have, been accessing the logically deleted control block have completed, that control block is finally physically deleted.

The present invention has been developed in response to the present state of the art, and in particular, in response to the problems and needs in the art that have not yet been fully solved by currently available transaction management systems. Accordingly, the present invention has been developed to provide a computer program product and system for deferring the deletion of control blocks that overcomes many or all of the above-discussed shortcomings in the art.

The present invention helps to solve the aforementioned problem by deferring the deletion of control blocks by differentiating between long term running process tasks and short term running process and using flags for the long term tasks and a timer for the short term tasks before deletion.

As a result, the inventive method of deferring the deletion of control blocks allows transaction management systems to operate more effectively and efficiently than is possible in the present art.

The computer program product and system of the present invention configured to defer the deletion of control blocks includes a plurality of modules configured to functionally execute the necessary steps of (1), (2), (3), and (4). These functional units are described as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices.

The present invention, in one embodiment is configured as a computer program product comprising a computer readable medium having computer usable program code programmed as an information management system including a system resource queue module comprising an active queue and a delete pending queue, a state management module, an access module, a use module, a control block delete module, and a storage management module. The active and delete pending queues are both configured as linked-list data structures comprising resource control blocks. Each of the resource control blocks in the active and delete pending queues further a plurality of control flags corresponding with a specific resource control block The state management module is configured to accept a request to stop a resource associated with a resource control block and to then set the corresponding plurality of control flags to indicate a 'resource stopped' state. The state management module is further configured to accept a request to start a resource associated with a resource control block and to then set the corresponding plurality of control flags to indicate a 'resource started' state. The access module is configured to accept access requests from concurrent asynchronous long-term processes to use a resource associated with a resource control block. The access module is further configured to allow the access request when the associated resource control block is on the active queue and the corresponding plurality of control flags indicate a 'resource started' state, and reject the access request when either the associated resource control block is on the delete pending queue, or its corresponding plurality of control flags indicate a 'resource stopped' state. The use module is configured to respond to the access module granting access to a resource associated with a resource control block by setting the corresponding plurality of control flags to indicate a 'resource in use' state. The use module is further configured to accept requests from a concurrent asynchronous long-term process to release a resource associated with a resource control block and to then set the corresponding plurality of control flags to indicate 'resource not in use' state.

The control block delete module configured to accept requests to delete a resource associated with a resource control block. The control block delete module is further configured to reject the delete request when either the corresponding plurality of control flags indicate either a 'resource started' state or a 'resource in use' state, and accept the delete request when the corresponding plurality of control flag indicates both a 'resource stopped' state and a 'resource not in use' state, by moving the resource control block from the active queue to the delete pending queue. The storage management module is configured to a remove a resource control block from the delete pending queue and reclaim physical storage location associated therewith in response to the resource control block having been resident on the delete pending queue for a predetermined time period.

The present invention, in a second embodiment that uses multiple 'resource in use' control flags, is configured as a computer program product comprising a computer readable medium having computer usable program code programmed as an information management system including a system resource queue module comprising an active queue and a delete pending queue, a state management module, an access module, a use module, a control block delete module, and a storage management module. The active and delete pending queues are both configured as linked-list data structures comprising resource control blocks. Each of the resource control blocks in the active and delete pending queues further include a 'resource stopped' control flag corresponding with a specific resource control block, a plurality of 'resource in use' control flags corresponding with a specific resource control block, and a 'request deletion' control flag corresponding with a specific resource control block.

The state management module is configured to accept a request to stop a resource associated with a resource control block and to set the 'resource stopped' control flag. The state management module is further configured to accept a request to start a resource associated with a resource control block and to unset the 'resource stopped' control flag. The access module configured to accept access requests from concurrent asynchronous long-term processes to use a resource associated with a resource control block. The access module is further configured to allow the access request when the associated resource control block is on the active queue and the 'resource stopped' control flag is not set, and reject the access request when either the associated resource control block is on the delete pending queue, or its 'resource stopped' flag is set. The use module is configured to respond to the access module granting access to a resource associated with a resource control block by setting the 'resource in use' control flag. The use module is further configured to accept requests from a concurrent asynchronous long-term process to release a resource associated with a resource control block and to unset the 'resource in use' control flag.

The control block delete module configured to accept requests to delete a resource associated with a resource control block. The control block delete module is further configured to reject the delete request when either the 'resource stopped' control flag is not set or the 'resource in use' control flag is set, and accept the delete request when the 'resource stopped' control flag corresponding is set and none of the 'resource in use' control flags are set, by moving the resource control block from the active queue to the delete pending queue. The storage management module is configured to a remove a resource control block from the delete pending queue and reclaim physical storage location associated therewith in response to the resource control block having been resident on the delete pending queue for a predetermined time period.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

The described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
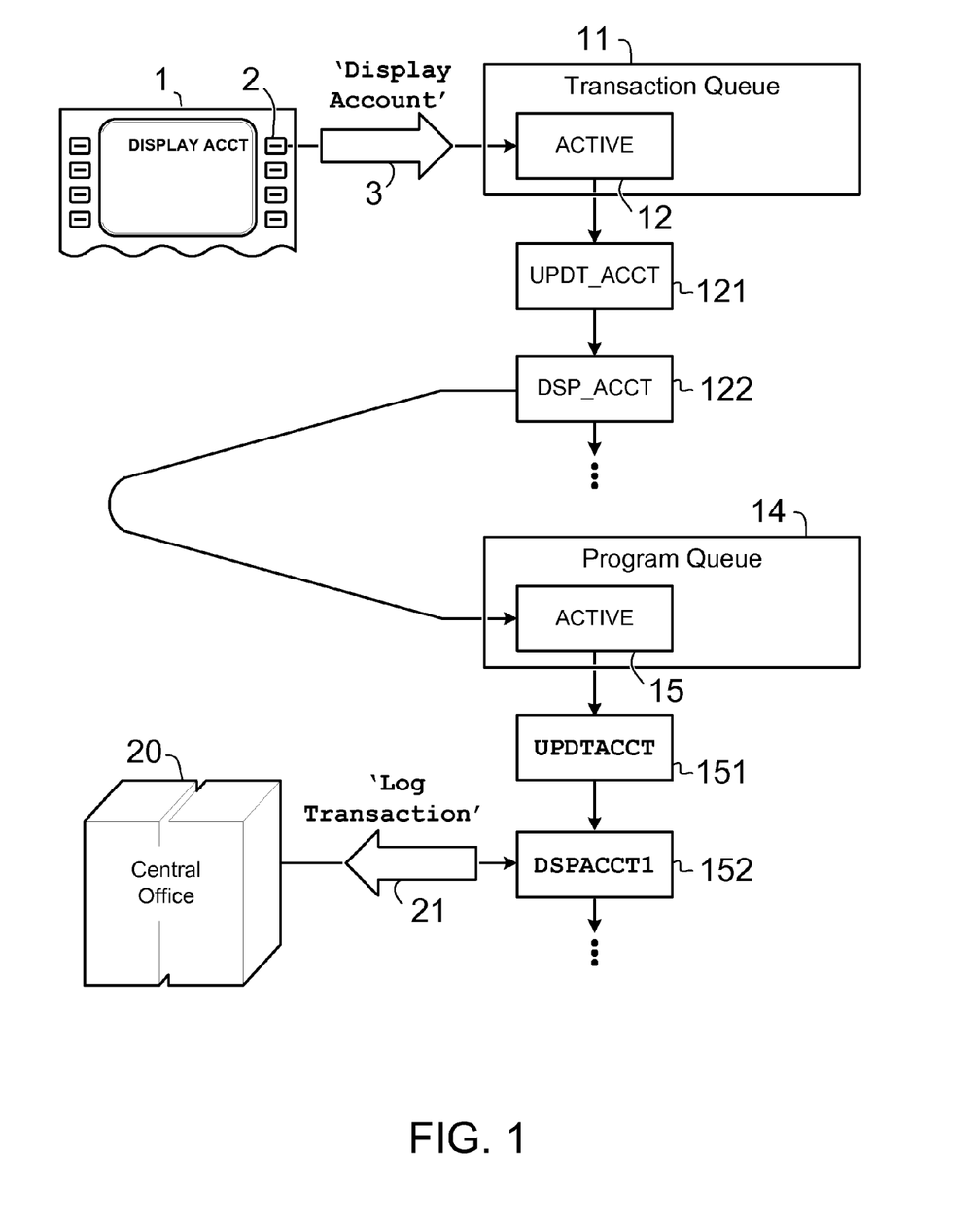
FIG. 1 depicts a transaction management system interacting with a automated teller machine and including a transaction and program queue.

Refer now to FIG. 1. A bank provides a service to its customers, which allows them to display their accounts from an automated teller machine (ATM) machine 1. This ATM machine 1 includes a 'Display Account' button 2 which, when depressed, causes the ATM machine to submit a 'Display Account' transaction (DSP_ACCT) via a network 3 to the bank's central information management system (IMS), database and transaction product available from IBM.

When the IMS 10 receives a transaction request, it begins to search its transaction queue 11 to locate a particular resource control block that is used to manage the requested transaction. More specifically, for the ATM Display Account transaction, IMS 10 accesses the active transaction queue 12 and transverses a linked list data structure, including an Update Account (UPDT_ACCT) transaction resource control block 121, to finally locate the Display Account (DSP_ACCT) transaction resource control block 122. The DSP_ACCT transaction control block 122 contains the name of the application program that needs to be run, by IMS 10, to perform the display account function.

IMS 10 then begins to search its program queue 14 to locate the particular resource control block that is associated with the application program named in the transaction resource control block. More specifically, for the ATM Display Account transaction, IMS 10 accesses the active program queue 15 and transverses a linked list data structure, including an Update Account (UPDTACCT) program control block 151, to finally locate a first version Display Account (DSPACCT1) program resource control block 152, which is used by IMS 10 to manage the first version Display Account application program. Subsequent to locating the DSPACCT1 program resource control block 152, IMS 10 schedules and runs the first version of the 'Display Account' application program. The Display Account application program runs, obtains information about the ATM user's account, and builds the output which is eventually sent back to the customer at the ATM machine 1.

The processes associated with the Display account transaction are relatively long-term and do not occur according to a preplanned schedule. Such processes can be referred to as 'asynchronous long-term-processes'.

The bank central office 20 will periodically log all account activity across the bank's entire ATM network. For example, the central office 20 may access the DSPACCT1 program resource control block 152 in order to request to log the particular transaction. Such as by issuing 'log transaction' command 21. This periodic process happens very quickly and can be referred to as a 'short-term process'. As another example of a short-term process, a, a system programmer at the bank central office 20 may be issuing query commands to query information about current transactions and programs defined to the IMS 10 system, while are displaying their accounts from the ATM machine1 For example, query commands can cause IMS 10 to scan through the active resource control blocks to obtain information about which IMS 10 system resources are being used.

Figure 2:
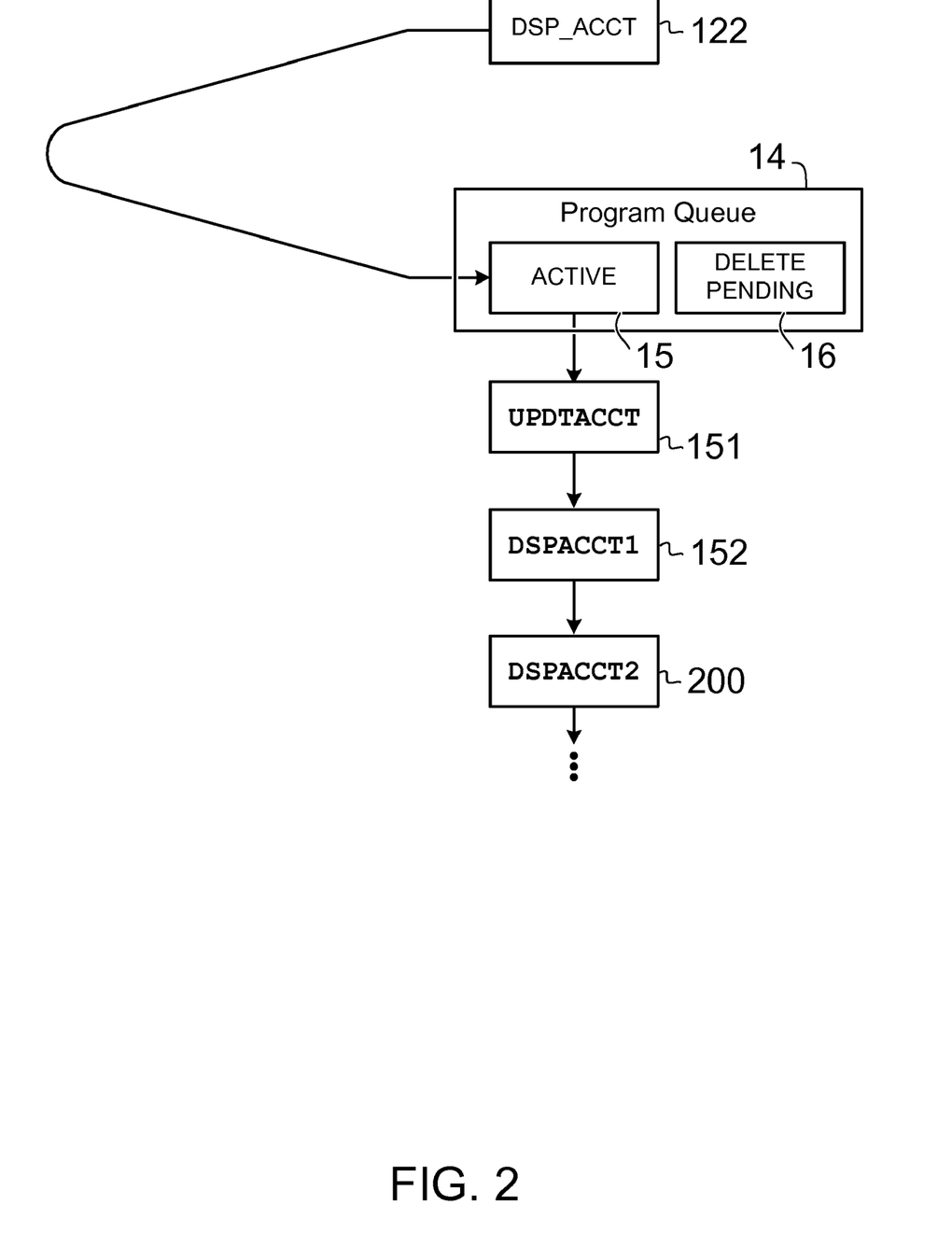
FIG. 2 depicts further detail of the program management queue when an replacement program is first added in accordance with an illustrative embodiment of the present invention.

Now refer to FIG. 2. A bank employee has written a second version of the 'Display Account' application program DSPACCT2, perhaps to mask the full account number for privacy purposes, to display account information. Now, when a customer issues a Display Account transaction, it is desired to run the second version of the Display Account program DSPACCT2 200 instead of the older first version of the Display Account program DSPACCT1 152. The information management system IMS can redirect the pointer in the linked list program active queue 15 to point to DSPACCT2 200 instead of DSPACCT1. However, either long-term or short-term processes may have accessed the pointer to DSPACCT1 152 and if the data in the underlying storage space is deleted, the IMS may suffer an unpredictable condition. In order to preclude such an unpredictable condition, the present invention moves the older first version of the Display Account program DSPACCT1 152 to a program pending delete queue 16, which is also configured as a linked list.

The IMS distinguishes between long-term and short term processes; if a long-term process is accessing a resource control block then the block is undeletable. For example, the IMS will reject a delete request if any long-term process is accessing a resource control block, resource control is in use, or the resource control block is 'started'.

Figure 3:
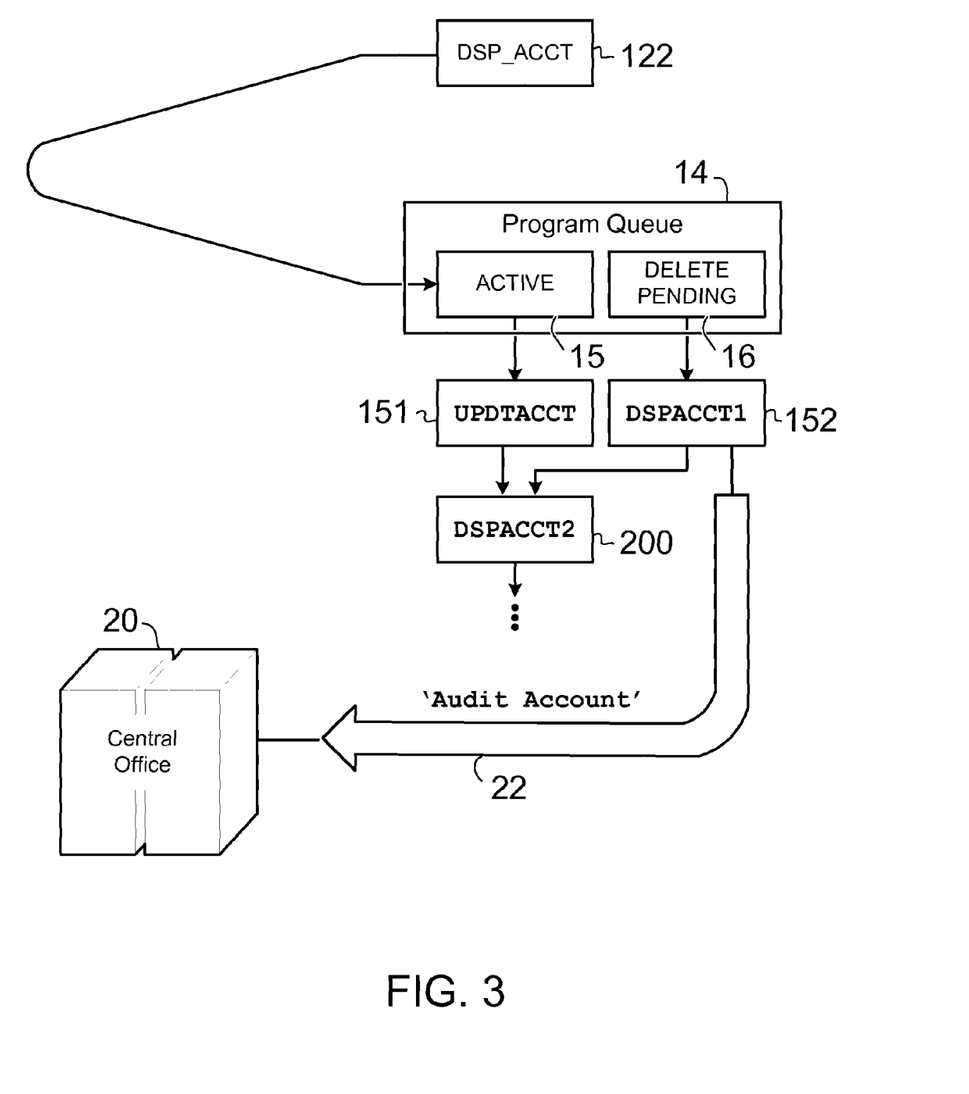
FIG. 3 depicts further detail of the program management queue, of FIG. 2, after an original program is moved to a pending delete queue.

However, short-term processes that have already obtained a pointer to the resource control block, such as an 'Audit Account' transaction 22 from the bank central office 20 will still be allowed to access the underlying storage space. For long-term processes, control flags are used to limit the operation of a delete command. The present invention takes advantage of the fact that short-term processes have a very limited lifespan in order to eliminate a complex set of control flags that would otherwise be required for deletion control.

The present invention uses serialization to manage long term processes and no serialization for short term processes. Advantageously, the present invention avoids serialization complexity for short-term processes. A time-delay interval prior to actual deletion, such as the release of the underlying storage space, allows short-term processes to safely finish. Accordingly, the IMS will automatically delete the first version of the Display Account program DSPACCT1 152 from the program delete pending queue 16 after a predetermined time interval has elapsed.

Figure 4:
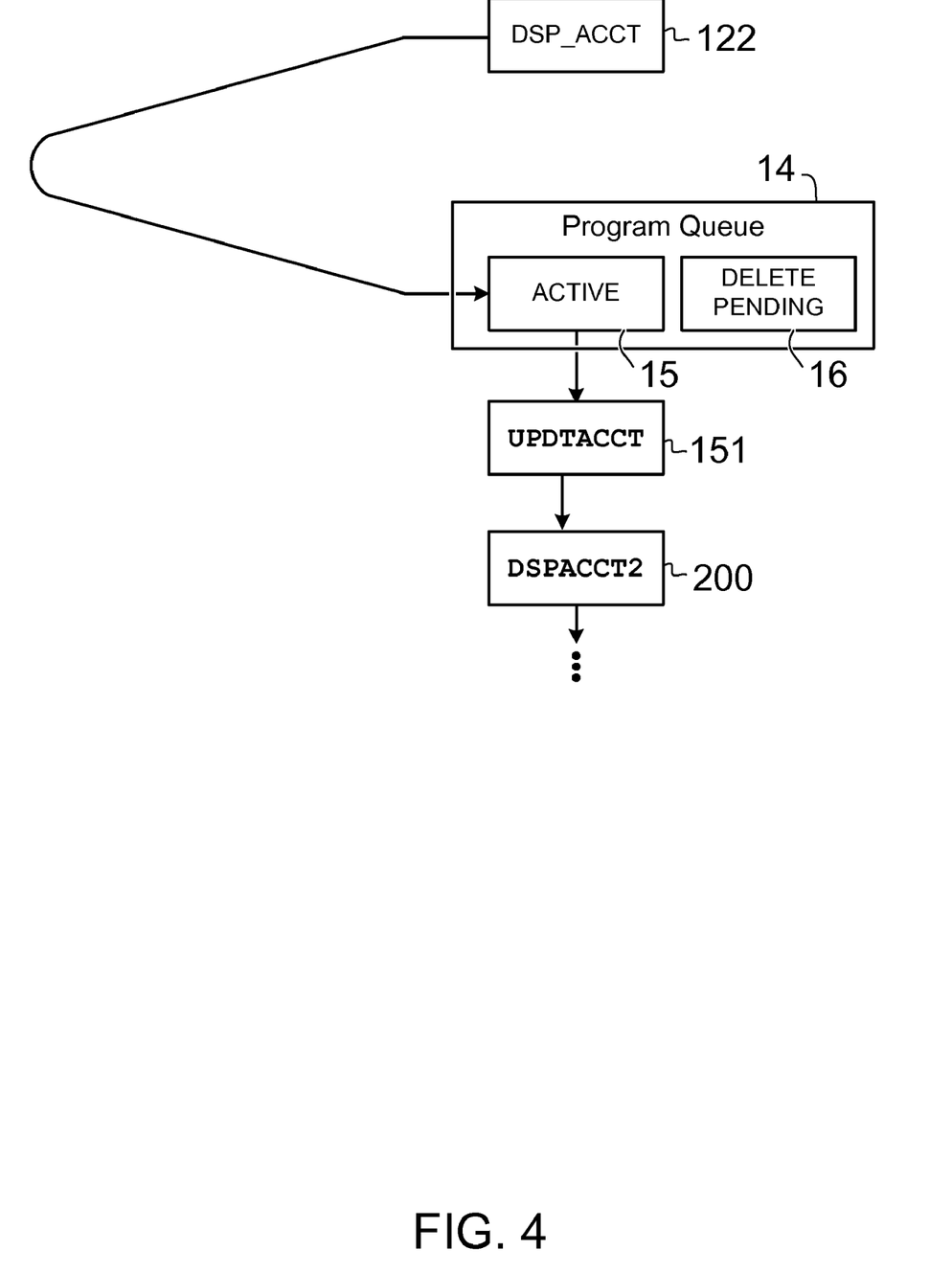
FIG. 4 depicts further detail of the program management queue after an original program is completely replaced by the replacement program of FIG. 2.

FIG. 4 illustrates the program queue 14 after this time period has elapsed. Note that the program active queue 15 now contains the linked list including an Update Account program UPDACCT 151 and the second version of the Display Account program DSPACCT2 200. Also note that the program delete pending queue 16 is now empty.

Figure 5:
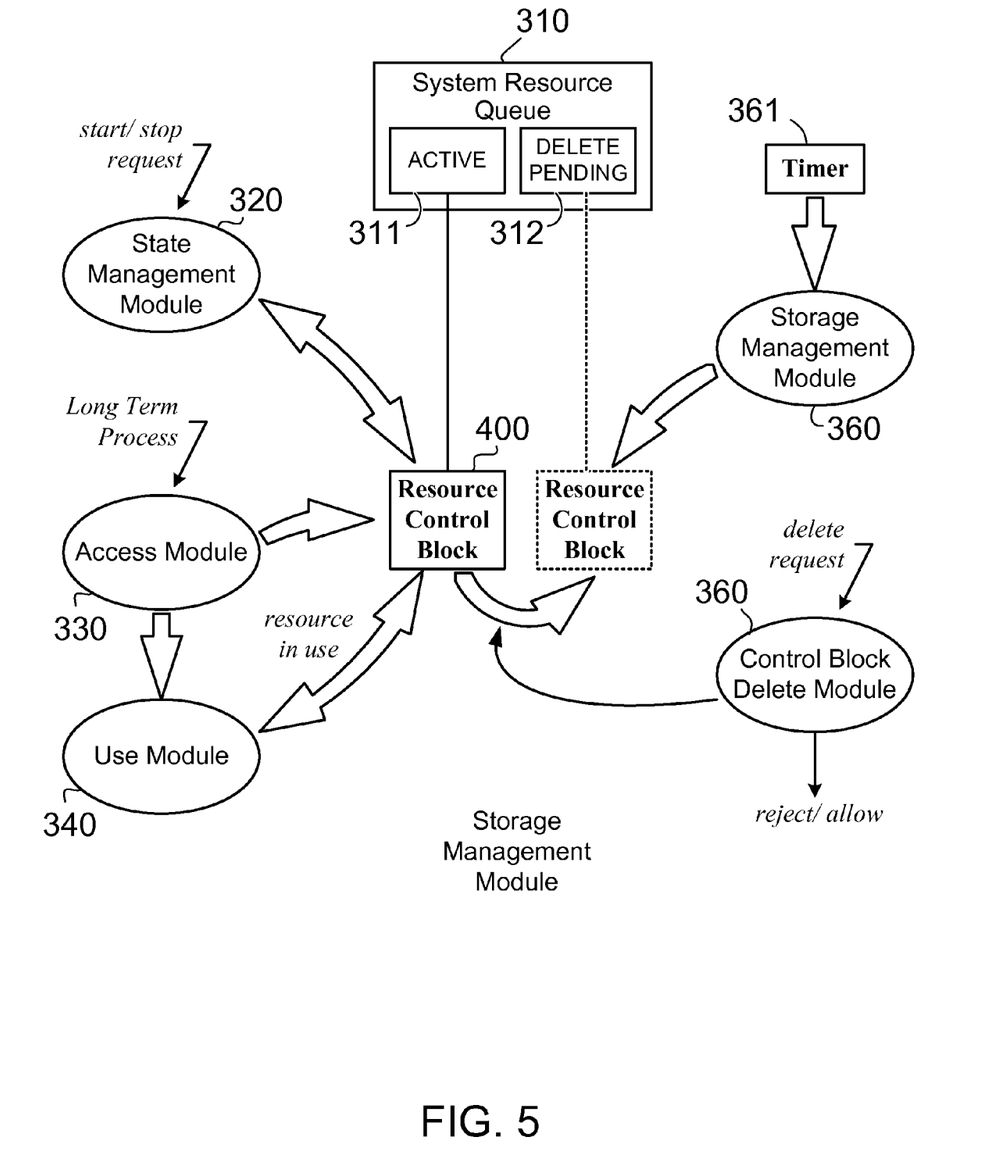
FIG. 5 depicts the interaction of several of the modules in a computer program product in accordance with an illustrative embodiment of the present invention.

Now refer to FIG. 5 which illustrates some of the functionality of the inventive information management system IMS, which performs the example operations that have been previously described. Both the transaction queue 11 and the program queue 14, shown in FIG. 1, are particular instances of a more general system resource queue 310 which further comprises an active queue 311 and a delete pending queue 312. Both the active queue 311 and the delete pending queue 312 are organized as linked-list data structures containing resource control blocks 400, such as the program and transaction resource control blocks shown in FIGS. 1-3.

The state management module 320 controls the 'started' or 'stopped' state of each resource control block 400. For example, IMS users can issue commands to stop resources such as programs or transactions. IMS users can also issue commands to start resources. Stopping a resource prevents it from being used by certain processes. For example if a program is stopped, it cannot be scheduled. A resource must be stopped (to ensure no one uses it) before it is deleted. IMS users can issue a command to stop the resource before issuing a delete request. If the resource is not stopped when IMS processes a delete request, IMS will try to stop the resource.

The access module 330 controls access, by long-term processes to each of the resource control blocks 400. During normal processing, control blocks that manage system resources are placed on active queues, such as for example, a plurality of linked lists. Find and scan routines are used to locate resource control blocks on the active queues. In one embodiment, each long-term process task, such as transaction scheduling, has an associated logical 'active started' flag included in each control block that can be accessed by such a long-term process task. Requests to delete a control block with any 'active started' flag set will result in a 'request fail.'

The use module 340 responds to the access module granting access to a resource associated with a resource control block by setting that block to a 'resource in use' logical state. The use module 340 also accept requests from a concurrent asynchronous long-term process to release a resource associated with a resource control block 400 and to unset the 'resource in use' logical state. Prior to being deleted, a resource must be placed in a state where no long-running processes can be accessing the resource block. This is called the stopped state. When a resource is stopped, no new long-running process task is able to access the block. Further conditions may be required beyond being stopped for a resource to be deletable (for example, a transaction resource might need to both be stopped, and have no work (messages) queued to it before it will be eligible to be deleted).

The control block delete module 350 accepts requests to delete a resource associated with a resource control block 400. The control block delete module 350 rejects the delete requests when the resource control block 400 indicates either a 'resource stopped' logical state or a 'resource in use' logical state. The control block delete module 350 accepts delete requests when the resource control block 400 indicates both a 'resource stopped' logical state and a 'resource not in use' logical state. Upon accepting the delete command, the control block delete module 350 moves the resource control block 400 from the active queue 311 to the delete pending queue 312. When a request is issued to delete a control block and the resource is in a state where no long-running processes can access it, the control block is marked deleted, removed from the active queue, and placed on a delete pending queue. At this time, short-running processes may still be accessing the block. In this context, a short-running process is one that is looking at a resource control block once at a specific instance in time. For example, a command to display information about a resource might locate the resource's block, extract the information from it for the display, and then be finished accessing the block. The short-term process does not "sit on" or save the resource block's address pointer for later use.

The storage management module 360 is configured to a remove a resource control block 400 from the delete pending queue 312 and reclaim the associated physical storage locations after the resource control block 400 has been resident on the delete pending queue 312 for a predetermined time period. For example, such removal could be triggered by timer 361. The control block 400 remains on the delete pending queue 312 for an interval of time. This could be a fixed period of time, or it could be after a certain number of periodic external events have occurred. Once the interval of time expires the storage can be released.

Once a control block 400 is removed from the active queue 311, no new tasks are able to locate the control block using the find and scan routines. If a task is in the process of referencing a control block when the delete request is issued, the task can continue to access the control block without abnormally terminating, since the storage is not physically deleted. This works as long as only short-running processes are accessing the block, and as long as the time interval which the block is resident on the pending delete queue is large relative to the expected short-running access time.

Control blocks 400 on the delete pending queue 312 can be physically deleted after spending a long interval on the delete pending queue (long relative to the short-running process times). An example of a long interval may include five minutes where the time required by the short-term processes is less than a second. Another example of a long interval may include fifteen minutes where the time required by the short-term processes is less than a second. A system event or a timer 361 can be used to trigger when the control blocks on the delete queue are examined and cleaned up.

In one embodiment, IMS uses both the system checkpoint process and an elapsed time value to trigger the examination of the delete queue. IMS resource control blocks are eligible to be deleted after two checkpoints and when a fixed period of time (measured in minutes) has elapsed. Being on the delete queue 312 for two checkpoints and for this minimum elapsed time is several orders of magnitude longer than the expected short-running process access time, and is sufficient time for these processes to have completed. When the system event or timer interval occurs, compare and swap logic is used to zero the delete queue pointer and remove the chain of elements. Once the chain of elements is removed, each delete queue element on the chain is examined. The count field in the delete queue element is incremented. The incremented count is then used to determine if the element has been on the queue more than the specified number of system events. If so, then if it is also true that the current time minus the delete time is greater than the minimum elapsed time value, then the delete queue element is removed from the delete queue chain. The address of the control block storage to be released is obtained from the delete queue element and the control block storage is released.

Figure 6:
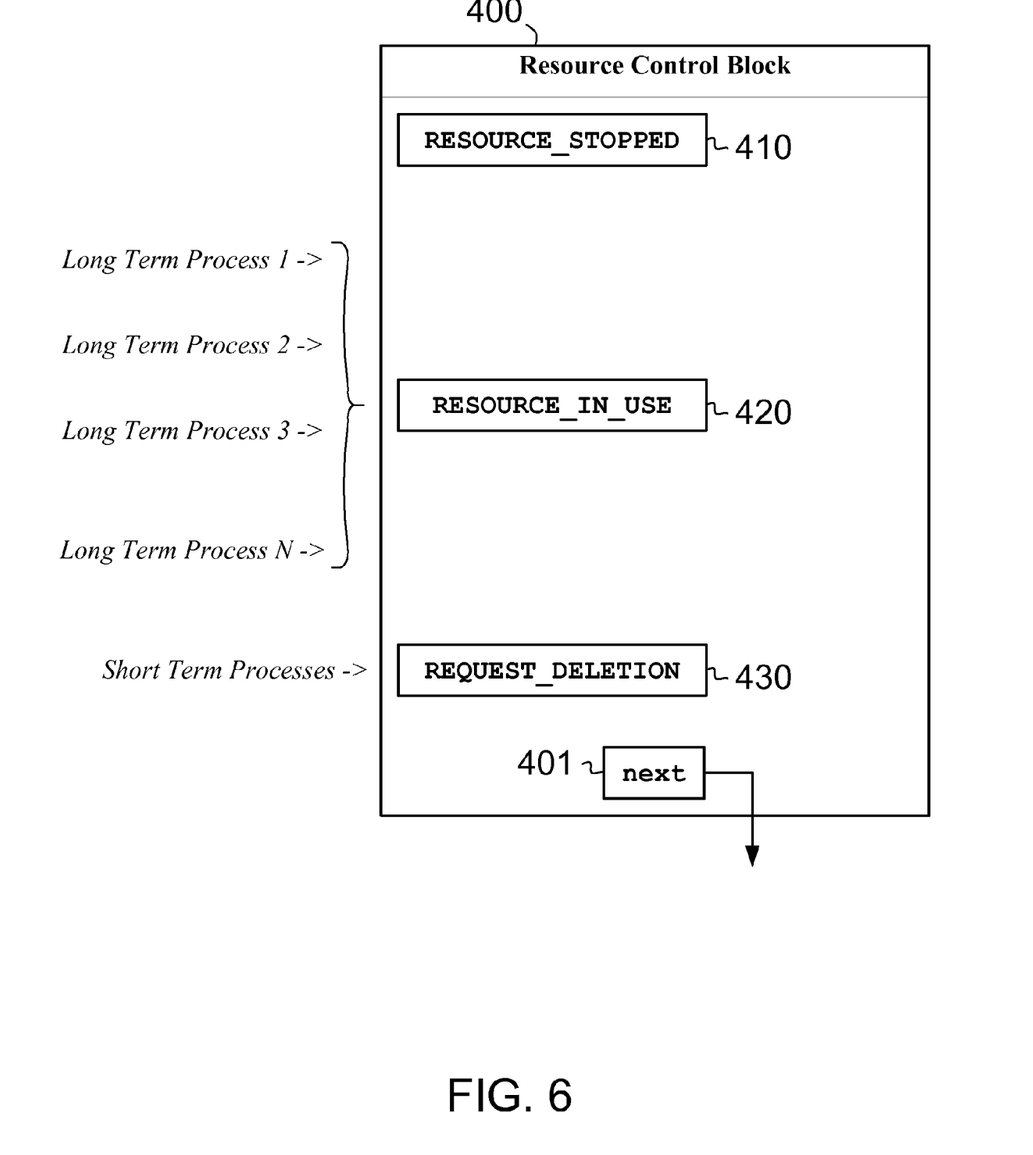
FIG. 6 depicts some internals of a resource control block in accordance with a first illustrative embodiment of the present invention.
Figure 7:
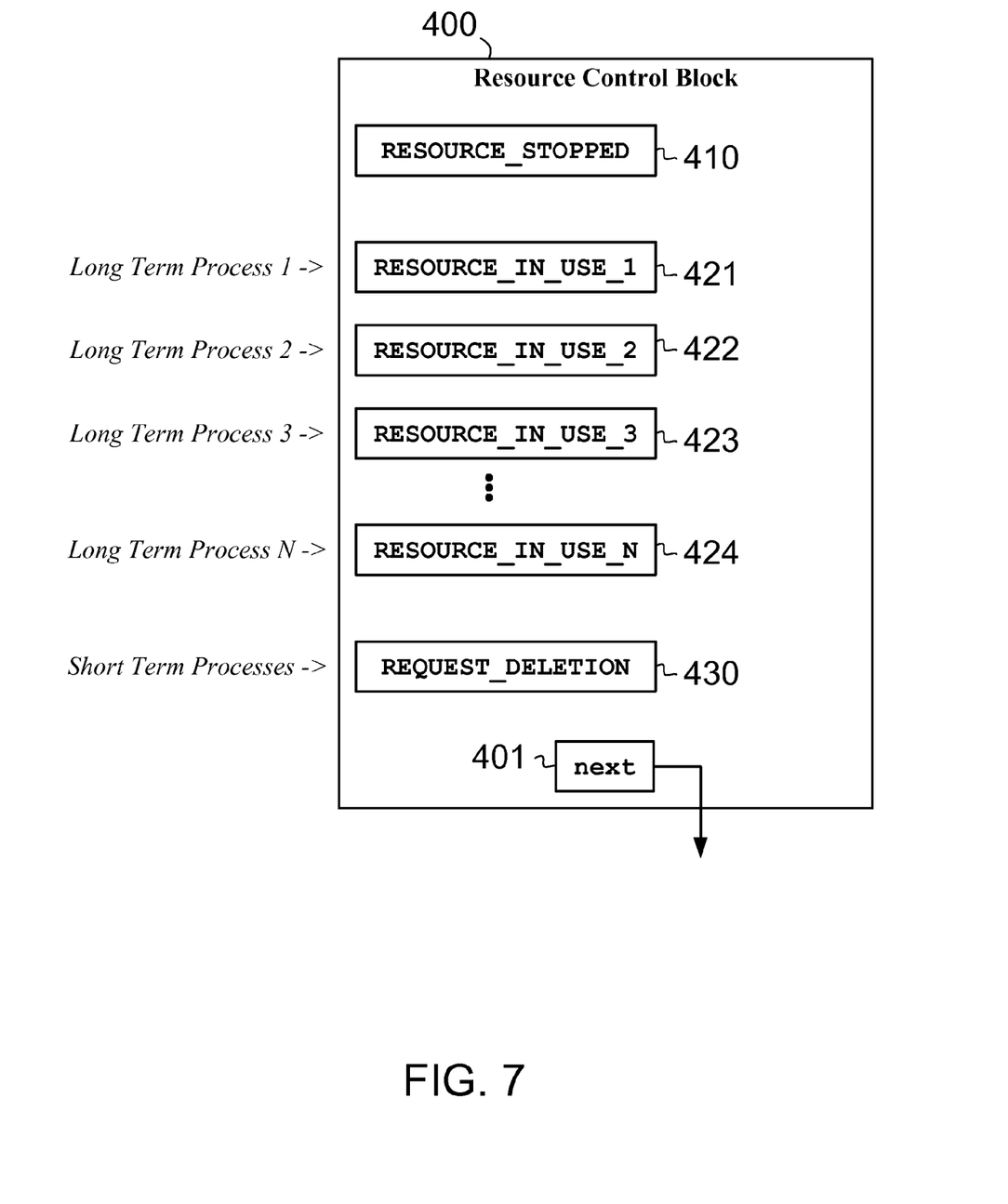
FIG. 7 depicts some internals of a resource control block in accordance with a second illustrative embodiment of the present invention.

FIGS. 6 and 7 illustrate control flag configurations that are used in certain embodiments of the present invention to designate the control state of a particular resource control block 400. The next pointer 401, associated with the linked-list data structure is shown for contextual reference.

The 'resource stopped' control flag 410 is managed by the state management module 320 shown in FIG. 5.

The 'resource in use' control flag 420 is managed by the use module 340 shown in FIG. 5. In one embodiment, shown in FIG. 6, one 'resource in use' flag 420 indicates that the resource control block 400 is being used by any long-term process. In a second embodiment, shown in FIG. 7, each long-term process that can access the resource control block 400 has a dedicated 'resource in use' control flag. For example, this second embodiment could have 'N' long term processes and associated control flags (421, 422, 423, and 424).

The 'request deletion' control flag 430 is managed by the control block delete module 360, shown in FIG. 5. In certain embodiments, this flag is associated with access and deletion requests by short-term processes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored in a memory, executed by a processor, and performing the operations of:
    providing an active queue and a delete pending queue, where the active and delete pending queues are both configured as linked-list data structures comprising resource control blocks and where each of the resource control blocks in the active and delete pending queues further comprise a plurality of control flags corresponding with a specific resource control block;
    creating a first resource control block for a first resource in response to a first request from a concurrent asynchronous long-term first process;
    creating a second resource control block for the first resource in response to a second request from a concurrent asynchronous long-term second process;
    moving the first resource control block to the delete pending queue when the second resource control block is created for the first resource;
    accepting a first access request from a concurrent short-term third process to use the first resource;
    associating the third process to the first control block on the delete pending queue;
    receiving a delete request to delete the first resource control block;
    rejecting the delete request if the first resource control block is in use by the first process; and
    deleting the first resource control block from the delete pending queue without verifying that the first resource control block is in use by the third process if the first resource control block is not in use by the first process and if the first resource control block is on the delete pending queue for a predetermined time period equal to a time required for the third process to finish.

2. The computer program product of claim 1 wherein
    each resource control block of the active queue portion linked-list data structure is associated with a corresponding physical storage location and each of the resource control blocks includes a next pointer that points to a subsequent resource control block, with the next pointer within a last resource control block being set to null; and
    each resource control block of the delete pending queue portion linked-list data structure is associated with a corresponding physical storage location and each of the resource control blocks includes a next pointer that points to a subsequent resource control block, with the next pointer within a last resource control block being set to null.

3. The computer program product of claim 1 further comprising generating checkpoints at a periodic rate and deferring the deletion of the first resource control block until two checkpoints have elapsed.

4. The computer program product of claim 1 further comprising additional system resource queues where each of the additional system resource queues is dedicated to a particular resource type.

5. The computer program product of claim 4 where the particular resource types are selected from the set consisting of: transactions, programs, and databases.

6. The computer program product of claim 1, wherein each resource control block comprises a resource stopped flag that is set in response to a request to stop a resource associated with the resource control block, at least one resource in use flag associated with at least one concurrent asynchronous long-term process using the resource associated with the resource control block, and a request deletion flag that is set if at least one short-term process is associated with the resource control block.

7. A method comprising a memory storing a computer program product executable by a processor to perform the operations of:
    providing an active queue and a delete pending queue, where the active and delete pending queues are both configured as linked-list data structures comprising resource control blocks and where each of the resource control blocks in the active and delete pending queues further comprise a plurality of control flags corresponding with a specific resource control block;
    creating a first resource control block for a first resource in response to a first request from a concurrent asynchronous long-term first process;
    creating a second resource control block for the first resource in response to a second request from a concurrent asynchronous long-term second process;
    moving the first resource control block to the delete pending queue when the second resource control block is created for the first resource;
    accepting a first access request from a concurrent short-term third process to use the first resource;
    associating the third process to the first control block on the delete pending queue;
    receiving a delete request to delete the first resource control block;
    rejecting the delete request if the first resource control block is in use by the first process; and deleting the first resource control block from the delete pending queue without verifying that the first resource control block is in use by the third process if the first resource control block is not in use by the first process and if the first resource control block is on the delete pending queue for a predetermined time period equal to a time required for the third process to finish.

8. The method of claim 7, wherein each resource control block comprises a resource stopped flag that is set in response to a request to stop a resource associated with the resource control block, at least one resource in use flag associated with at least one concurrent asynchronous long-term process using the resource associated with the resource control block, and a request deletion flag that is set if at least one short-term process is associated with the resource control block.

* * * * *